United States Patent
Kuriger et al.

(10) Patent No.: US 10,368,175 B2
(45) Date of Patent: Jul. 30, 2019

(54) HEARING DEVICE COMPRISING A FEEDBACK DETECTION UNIT

(71) Applicant: Oticon A/S, Smørum (DK)

(72) Inventors: Martin Kuriger, Bern (CH); Bernhard Kuenzle, Bern (CH); Meng Guo, Smørum (DK)

(73) Assignee: OTICON A/S, Smørum (DK)

( * ) Notice: Subject to any disclaimer, the term of this patent is extended or adjusted under 35 U.S.C. 154(b) by 0 days.

(21) Appl. No.: 15/690,688

(22) Filed: Aug. 30, 2017

(65) Prior Publication Data

US 2018/0063654 A1 Mar. 1, 2018

(30) Foreign Application Priority Data

Aug. 30, 2016 (EP) ..................... 16186338

(51) Int. Cl.
*H04M 9/08* (2006.01)
*H04R 3/02* (2006.01)
*H04R 25/00* (2006.01)

(52) U.S. Cl.
CPC .......... *H04R 25/505* (2013.01); *H04M 9/082* (2013.01); *H04R 25/453* (2013.01); *H04R 3/02* (2013.01); *H04R 2430/03* (2013.01)

(58) Field of Classification Search
CPC ...... H04R 25/505; H04R 25/407; H04R 3/02; H04R 25/70; H04R 2225/43; H04R 25/554; H04R 25/353; H04R 25/405; H04R 2430/03; H04R 25/552; H04R 3/005; H04R 2225/025; H04R 2225/41; H04R 2225/55;
(Continued)

(56) References Cited

U.S. PATENT DOCUMENTS

2003/0007647 A1* 1/2003 Nielsen ............... H04R 25/305
381/60
2004/0252853 A1 12/2004 Blamey et al.
(Continued)

FOREIGN PATENT DOCUMENTS

EP  2523471 A1  11/2012
EP  2613556 A1   7/2013
(Continued)

*Primary Examiner* — Curtis A Kuntz
*Assistant Examiner* — Julie X Dang
(74) *Attorney, Agent, or Firm* — Birch, Stewart, Kolasch & Birch, LLP

(57) ABSTRACT

A hearing device, e.g. a hearing aid, comprises a forward path for processing an electric signal representing sound including a) an input unit for receiving or providing an electric input signal representing sound, b) a signal processing unit, c) an output transducer for generating stimuli perceivable as sound to a user, d) a feedback detection unit configured to detect feedback or evaluate a risk of feedback via an acoustic or mechanical or electrical feedback path from said output transducer to said input unit and comprising d1) a magnitude and phase analysis unit for repeatedly determining magnitude, Mag, and phase, Phase, of said electric input signal and further parameters based thereon, and d2) a feedback conditions and detection unit configured to check criteria for magnitude and phase feedback condition, respectively, based on said values, and to provide a feedback detection signal indicative of feedback or a risk of feedback.

20 Claims, 7 Drawing Sheets

(58) Field of Classification Search
CPC .......................... H04R 25/356; H04R 27/00; H04R 2225/021; H04R 2225/67; H04R 25/50; H04R 2499/11; H04R 9/06; H04R 9/025; H04R 2499/15; H04R 1/023; H04R 31/003; H04R 7/18; H04R 9/045; H04R 1/025; H04R 1/026; H04R 2209/022; H04R 3/007; H04R 7/125; H04R 9/022; H04R 1/06; H04R 1/2811; H04R 1/288
USPC ......... 381/315–318, 412, 164, 351; 181/157, 181/153; 156/293
See application file for complete search history.

(56) References Cited

U.S. PATENT DOCUMENTS

| | | | | |
|---|---|---|---|---|
| 2005/0047620 | A1* | 3/2005 | Fretz .................... | H04R 25/453 381/318 |
| 2010/0150388 | A1* | 6/2010 | Korl .................... | H04R 25/453 381/318 |
| 2011/0311075 | A1* | 12/2011 | Elmedyb .............. | H04R 25/353 381/94.2 |
| 2012/0263311 | A1* | 10/2012 | Neugebauer ........... | G10K 15/12 381/63 |

FOREIGN PATENT DOCUMENTS

| | | | | |
|---|---|---|---|---|
| EP | 2613566 | A1 * | 7/2013 | ........... H04R 25/305 |
| EP | 3002959 | A1 | 4/2016 | |

* cited by examiner

HEARING DEVICE COMPRISING A FEEDBACK DETECTION UNIT

SUMMARY

The present disclosure relates to hearing devices, e.g. hearing aids, in particular to feedback detection and control in hearing devices.

In modern hearing aids, a feedback control system is used to minimize the negative effects from the acoustic feedback problem.

Information about the current feedback situation is a useful knowledge to the feedback cancellation system. A feedback detector is often used to determine critical feedback situations, and it provides this information to the feedback control system to control its behaviour, to ensure the best possible feedback performance.

The present disclosure presents a method of detecting critical feedback situations by estimating the open loop magnitude function and the open loop phase function.

A Hearing Device:

In an aspect of the present application, a hearing device, e.g. a hearing aid, comprising a forward path for processing an electric signal representing sound, the forward path comprising an input unit for receiving or providing an electric input signal IN representing sound, a signal processing unit for applying a frequency- and/or level-dependent gain to an input signal of the forward path and providing a processed output signal, and an output transducer for generating stimuli perceivable as sound to a user.

The hearing device further comprises a feedback detection unit configured to detect feedback or evaluate a risk of feedback via an acoustic or mechanical or electrical feedback path from said output transducer to said input unit is provided.

A loop is defined consisting of said forward path and said feedback path, the loop exhibiting a loop delay D.

The feedback detection unit comprises a magnitude and phase analysis unit for repeatedly determining magnitude, Mag, and phase, Phase, of said electric input signal IN, or a processed version thereof, and further configured to determine values of loop magnitude (LpMag), loop phase (LpPhase), loop magnitude difference (LpMagDiff), and loop phase difference signals (LpPhaseDiff), respectively, based thereon and on said loop delay D;

a feedback conditions and detection unit configured to check criteria for magnitude and phase feedback condition, respectively, based on said values of loop magnitude (LpMag), loop phase (LpPhase), loop magnitude difference (LpMagDiff), and loop phase difference signals (LpPhaseDiff), respectively, and to provide feedback detection signal, FbDet, indicative of feedback or a risk of feedback.

Thereby an improved feedback detection may be provided.

Acoustic feedback is taken to mean feedback that propagates as sound (in air) from an output transducer to an input transducer of the hearing device. Electrical feedback may e.g. be in the form of noise induced in conductors (crosstalk) or picked up from the coil of the loudspeaker. Mechanical feedback is taken to mean feedback that propagates as mechanical vibration of a housing or other physical parts of the hearing device from an output transducer to an input transducer as vibration.

A (feedback) loop is defined as an external (e.g. acoustic) path, where loop delay D is taken to mean the time required for a signal to travel through the loop consisting of the forward path of the hearing device and the feedback path from output transducer to input unit of the hearing device from an output transducer to an input unit and an internal (e.g. electric, processing) path from the input unit to the output transducer. The (feedback) loop defines (or exhibits) a loop delay D.

In an embodiment, the loop consists of said forward path and the acoustic feedback path, the loop exhibiting a loop delay $D_a$. In an embodiment, the loop consists of said forward path and the mechanical feedback path, the loop exhibiting a loop delay $D_m$. In an embodiment, the loop consists of said forward path and the electric feedback path, the loop exhibiting a loop delay $D_e$.

The term 'repeatedly determining' (magnitude, Mag, etc.) is in the present context taken to mean, determine according to a certain scheme, e.g. a predefined scheme, e.g. with a certain frequency, e.g. every time frame of the input signal, or every fraction of a time frame (e.g. where the time to time-frequency conversion involves overlapping time frames). In an embodiment, the term 'repeatedly determining' is associated with feedback loop delay D (see definition below), e.g. to ensure that values of the parameters in question are available (at least) with a distance in time corresponding to one or more loop delays D (i.e. to zD, where z is an integer). In an embodiment, the term 'repeatedly determining' is taken to include determining the parameters in question at points in time . . . m'-2D, m'-D, m', or at points in time . . . , m'-zD, m', where z is a positive integer, and m' is a specific time instant of the hearing device. The term 'repeatedly determining' (magnitude, Mag, etc.) may include every previous successive time instant . . . , m-2, m-1, m, but may alternatively e.g. be taken mean every second (i.e. at . . . m-4, m-2, m) or every fourth (i.e. at . . . m-8, m-4, m), or every $D^{th}$ time instance (i.e. at . . . m-2D, m-D, m).

In an embodiment, a time unit of the hearing device is the length in time between two time instants, and in the present context of loop delay and parameters related to the loop, e.g. equal to the length in time $t_F$ of a time frame (e.g. one or more ms; a time frame may e.g. comprise $N_F$=64 audio samples, which with a sampling rate $f_s$ of e.g. 20 kHz has a duration of $N_F/f_s$, e.g. 64/20 ms=3.2 ms), or to a fraction $N_{OL}$ thereof, e.g. a fourth ($t_F/4$) or an eighth ($t_F/8$) of time frame (e.g. in case over overlapping time frames, where a new spectrum of the electric input signal is determined every $N_F/N_{OL}$ audio sample, or every time unit TU=($N_F/N_{OL}$)/$f_s$ 0.8 ms in for $N_F$=64, $N_{OL}$=4, fs=20 kHz). In this example, new values of loop magnitude, Mag, etc., may be determined every TU=0.8 ms. In an embodiment, loop delay D is 8 ms.

In an embodiment, the magnitude and phase analysis unit is configured to repeatedly determine magnitude, Mag, and phase, Phase, of said electric input signal IN in dependence of the feedback loop delay D, e.g. with a frequency of 1/D. An update of the loop magnitude, Mag, etc., with a frequency of 1/D as opposed to 1/TU would save processing power (and possibly memory) in that only 1 as opposed to D/TU values (in the above example D/TU=8/0.8=10) are determined (and possibly stored).

The term 'to provide feedback detection signal, FbDet(k, m), indicative of feedback or a risk of feedback' is in the present context taken to include to provide feedback detection signal, FbDet(k,m) that indicates whether or not a level of feedback in frequency band k at time unit m is larger than or smaller than a threshold value (a binary indication).

In an embodiment, the first and/or second threshold levels are frequency band specific (i.e. may be dependent on frequency band index k). In an embodiment, the first and/or second threshold levels can be time dependent (i.e. may depend on time index m).

In an embodiment, the hearing device comprises an analysis filter bank for converting said electric input signal IN to a number of frequency sub-band electric input signals IN(k,m), where k and m are frequency sub-band and time indices, respectively. In an embodiment, the filter bank is used to divide a time domain input signal into time-frequency domain (frequency sub-band) signals. For each time-frequency domain signal, feedback detection is separately determined.

In another embodiment, however, the feedback detection is done in the time-domain rather than time-frequency domain. In such case, the frequency and sub-band and time indices (k,m) are not used, and instead the full-band time index (n) applies.

In yet another embodiment, a band-limited signal (or signal(s)) is(are) used for feedback detection. In such case band index 1 and the time index m, i.e. (l,m), can e.g. be used (where one index 1' may cover one or more corresponding indices k (e.g. k', k'+1, k'+2).

In the time-frequency domain, the function of the magnitude and phase analysis unit and the feedback conditions and detection unit, respectively may be expressed as a magnitude and phase analysis unit for repeatedly determining magnitude Mag(k,m) and phase Phase(k,m) of said frequency sub-band electric input signals IN(k,m) and further configured to determine values of loop magnitude (LpMag), loop phase (LpPhase), loop magnitude difference (LpMagDiff), and loop phase difference signals (LpPhaseDiff), respectively, based thereon; and a feedback conditions and detection unit configured to check criteria for magnitude and phase feedback condition, respectively, based on said values of loop magnitude (LpMag(k,m)), loop phase (LpPhase(k,m)), loop magnitude difference (LpMagDiff(k,m)), and loop phase difference signals (LpPhaseDiff(k,m)), respectively, and to provide feedback detection signal, FbDet (k,m), indicative of feedback or a risk of feedback.

In an embodiment, the magnitude and phase analysis unit is configured to determine the loop magnitude at time instant m as $$LpMag(k,m)=Mag(k,m)-Mag(k,m_D),$$

where Mag(k,m) is the magnitude value of the electric input signal IN(k,m) at time m, whereas Mag(k,$m_D$) denotes the magnitude of the electric input signal IN(k,$m_D$) one feedback loop delay D earlier, and
to determine the loop phase LpPhase (in radian) at time instant m as $$LpPhase(k,m)=wrap(Phase(k,m)-Phase(k,m_D)),$$

where wrap(.) denotes the phase wrapping operator, the loop phase thus having a possible value range of [−π, π], and where Phase(k,m) and Phase (k,$m_D$) are the phase value of the electric input signal IN, at time instant m and at one feedback loop delay D earlier, respectively.

The feedback loop delay D is in the present context taken to mean the time required for a signal to travel through the loop consisting of the (electric) forward path of the hearing device and the (acoustic) feedback path from output transducer to input unit of the haring device (as illustrated in FIG. 3). The loop delay is taken to include the processing delay d of the (electric) forward path of the hearing device from input to output and the delay d' of the acoustic feedback path from the output transducer to the input unit of the hearing device, in other words, loop delay D=d+d'. In an embodiment, the feedback loop delay D is assumed to be known, e.g. measured or estimated in advance of the use of the hearing device, and e.g. stored in a memory or otherwise built into the system. In an embodiment, the hearing device is configured to (adaptively) measure or estimate the loop delay during use (e.g. automatically, e.g. during power-on, or initiated by a user via a user interface, or continuously, e.g. according to a predetermined scheme or when certain criteria are fulfilled). In an embodiment, the hearing device is configured to provide one value of loop magnitude and loop phase for each time index m, or for each time period corresponding to a current feedback loop delay (D), i.e. at times m'=p·D, where p=0, 1, 2, . . . .

In an embodiment, the magnitude and phase analysis unit is configured to determine the loop magnitude difference LpMagDiff(k,m) at time instant m as $$LpMagDiff(k,m)=LpMag(k,m)-LpMag(k,m_D).$$

where LpMag(k,m) and LpMag(k,$m_D$) are the values of the loop magnitude LpMag at time instant m and at a time instant $m_D$, one feedback loop delay D earlier, respectively, and to determine the loop phase difference LpPhaseDiff(k, m) at time instant m as $$LpPhaseDiff(k,m)=wrap(LpPhase(k,m)-LpPhase(k,m_D)).$$

where LpPhase(k,m) and LpPhase(k,m−D) are the values of the loop phase LpPhase at time instant m and at a time instant $m_D$ (m−D), one feedback loop delay D earlier, respectively.

In an embodiment, the loop delay D used for calculating LpMag, LpPhase, LpMagDiff and LpPhaseDiff is a frequency dependent value of loop delay D(k), where k is the frequency sub-band index. In an embodiment, the delay d' of the acoustic feedback path from the output to the input of the hearing device is frequency dependent. In an embodiment, the delay of the hearing device itself, i.e. the processing delay d of the (electric) forward path of the hearing device from input to output is frequency dependent. In an embodiment, the processing delay varies with frequency. In an embodiment, the processing delay increases with frequency (e.g. when the forward path comprises IIR filters). In an embodiment, a group delay of the acoustic feedback path is frequency dependent.

In an embodiment, the criterion for the loop magnitude feedback condition is defined as:

$$LpMagDet(k,m)=min(LpMag(k,m), \ldots, LpMag(k,m_{N \cdot D}))>MagThresh,$$

where N is a number of loop delays, $m_{N \cdot D}$ is the time instant N feedback loop delay D earlier, and MagThresh is a loop magnitude threshold value. In an embodiment, example values of N are 0, 1, 2, . . . . In an embodiment, the magnitude threshold value MagThresh is equal to −3 dB, or −2 dB, or −1 dB, or 0 dB, or +1 dB, or +2 dB, or +3 dB. In an embodiment, the magnitude feedback detection signal LpMagDet is a binary signal (0 or 1).

In an embodiment, the criterion for the loop phase feedback condition is defined as:

$$LpPhaseDet(k,m)=abs(LpPhase(k,m))<PhaseThresh,$$

where PhaseThresh is a threshold value. In an embodiment, the loop phase threshold value PhaseThresh is smaller than or equal to 0.5, 0.4, 0.3, 0.2, 0.1, 0.05, or 0.01 . . . (radians). In an embodiment, the phase feedback detection signal LpPhaseDet is a binary signal (0 or 1).

In an embodiment, a criterion for feedback detection is determined based on a combination of the criteria for loop magnitude and loop phase feedback conditions as FbDet(k,m)=and (LpMagDet(k,m), LpPhaseDet(k,m)).

In an embodiment, the feedback detection signal FbDet is e.g. a binary signal (0 or 1). The expression and (crit1, crit2) is taken to mean that for the expression to be true criterion 1 (crit1) as well as criterion 2 (crit2) have to be fulfilled.

In an embodiment, a criterion for feedback detection is determined based on a combination of criteria for loop magnitude (LpMag) and loop phase difference (LpPhaseDiff) feedback conditions, FbDet(k,m)=and (LpMagDet(k,m), LpPhaseDiffDet(k,m))

where a criterion for the loop phase difference feedback condition is defined as LpPhaseDiffDet(k,m)=abs(LpPhaseDiff(k,m))<PhaseDiffThresh.

In an embodiment, the loop magnitude threshold value MagThresh is equal to −1.5 dB, and the loop phase difference threshold value PhaseDiffThresh is equal to 0.3 (cf. e.g. FIG. 4B).

In an embodiment, the feedback detection unit further comprises a loop transfer function estimation and correction unit receiving as inputs the signals loop magnitude LpMag and loop phase LpPhase, and provides as an output the complex signal LtfEst representing an estimate of the complex loop transfer function. The complex signal LtfEst comprises magnitude (LpMagEst) and phase (LpPhaseEst) of the estimated loop transfer function. In an embodiment, the complex signal LtfEst is an output signal of the feedback detection unit.

In an embodiment, the loop transfer function estimation and correction unit is configured to receive an input related to a correction of the loop transfer function, e.g. due to actions initiated in response to a change of the feedback detection signal FbDet.

In an embodiment, the loop magnitude estimate LpMagEst(k,m) is computed as the linear combination of a number P of latest values of loop magnitude LpMag(k,m), $$LpMagEst(k, m) = \sum_{p=0}^{P-1} \alpha_p \cdot LpMag(k, m-p),$$

where $\alpha_p$ are non-negative scaling factors, and $\Sigma \alpha_p=1$. Example values of P and $\alpha_p$ can be P=2, and $\alpha_0=\alpha_1=0.5$. In an embodiment, P=4 and $\alpha_0=0.5$, $\alpha_1=0.25$, $\alpha_2=0.125$, $\alpha_3=0.125$.

Similarly, the loop phase estimate LpPhaseEst(k,m) is in an embodiment computed as the linear combination of latest Q values of loop phase LpPhase(k,m), $$LpPhaseEst(n) = \sum_{q=0}^{Q-1} \alpha_q \cdot LpPhase(k, m-q),$$

where $\alpha_q$ are non-negative scaling factors, and $\Sigma \alpha_q=1$.

In an embodiment, the hearing device, e.g. a hearing aid, further comprises an action information unit configured to take as inputs the feedback detection signal FbDet and the loop transfer function estimate LtfEst from the feedback detection unit and to provide as an output an action information signal ACINF. In an embodiment, the action information unit ACT is configured to receive information about the current (estimate) of the loop transfer function (LtfEst) AND the current feedback detection (FbDet, 0 or 1). Based on this information the action information unit ACT decides on appropriate actions (reduction of gain, increase adaptation rate of the feedback estimation, the application of frequency shift in the forward path, frequency transposition, notch filtering, half-wave rectification, etc.) and initiates such actions. In an embodiment, the action information signal ACINF is fed to the loop transfer function estimation and correction unit and is configured to correct the loop transfer function. In an embodiment, such correction may be due to an action initiated in response to a change of the feedback detection signal FbDet. In an embodiment, such action may relate to the change of a parameter of a feedback cancellation system, to a modification of a frequency shift applied to a signal of the forward path, to a modification of the applied forward gain of the forward path, etc.

In an embodiment, the action information unit ACT comprises an input control signal CTRL configured to activate actions that may influence the feedback detection. In an embodiment, the action information unit ACT is configured to receive control signals related to activation of one or more of the following: magnitude/phase changes, application of probe noise, changing adaptation speed, etc.

In an embodiment, the action information unit ACT is configured to test actions activated via the control signal of the action information unit ACT. In an embodiment, the feedback detection unit can be used to test the effect of different actions, e.g. actions intended to reduce feedback, such actions being e.g. activated via the control signal of the action information unit ACT. The test may e.g. comprise the following steps: A) the initial feedback is estimated with the feedback detection unit (UFFE), B) the CTRL signal to the action information unit ACT imposes an action to modify feedback (e.g., Gain reduction, phase modification, frequency transposition, compression, half-wave rectification, notch filtering, etc.), C) the feedback detection is re-estimated. These two subsequent measurements are then used to determine feedback (and the influence of the applied action).

In an embodiment, the feedback detection unit comprises different parallel processing units for providing a feedback detection signal FbDet($D_j$), each being configured to use a different loop delay $D_j$, j=1, 2, . . . , $N_D$, where $N_D$ is the number of different parallel processing units. In an embodiment, the feedback detection unit is configured to apply a (e.g. logic) criterion to the feedback detection signals FbDet ($D_j$), j=1, 2, . . . , $N_D$, to provide a resulting feedback detection signal FbDet. In an embodiment, the resulting FbDet=OR(FbDet($D_j$)), j=1, 2, . . . , $N_D$, i.e. FbDet equals to '1' (corresponding to feedback detection) if any (i.e. one or more) of the different feedback detection signals FbDet($D_j$) detects feedback. In an embodiment, the criterion is that resulting feedback detection signal FbDet is equal to '1', if more than one of the different feedback detection signals FbDet($D_j$) detect feedback.

In an embodiment, the hearing device comprises a listening device, e.g. a hearing aid, e.g. a hearing instrument, e.g. a hearing instrument adapted for being located at the ear or fully or partially in the ear canal of a user, e.g. a headset, an earphone, an ear protection device or a combination thereof. In an embodiment, the hearing device comprises a hearing aid, a headset, an earphone, an ear protection device or a combination thereof. In an embodiment, the hearing device is or constitutes a hearing aid.

The signal processing unit is configured for enhancing the input signals and providing a processed output signal. In an embodiment, the hearing device (e.g. the signal processing unit) is adapted to provide a frequency dependent gain and/or a level dependent compression and/or a transposition (with or without frequency compression) of one or more frequency ranges to one or more other frequency ranges, e.g. to compensate for a hearing impairment of a user. Various aspects of digital hearing aids are described in [Schaub; 2008].

The hearing device comprises an output transducer adapted for providing a stimulus perceived by the user as an acoustic signal based on a processed electric signal. In an embodiment, the output transducer comprises a receiver (loudspeaker) for providing the stimulus as an acoustic signal to the user. In an embodiment, the output transducer comprises a vibrator for providing the stimulus as mechanical vibration of a skull bone to the user (e.g. in a bone-attached or bone-anchored hearing device). In general, the term 'stimuli perceivable as sound to a user' is taken to include acoustic stimuli (sound, e.g. from a loudspeaker), electric stimuli (e.g. from an electrode array of a cochlear implant for stimulating the cochlear nerve) and mechanical stimuli (e.g. from a vibrator of a bone conducting hearing aid).

The hearing device comprises an input transducer for providing an electric input signal representing sound. In an embodiment, the hearing device comprises a directional microphone system adapted to enhance a target acoustic source among a multitude of acoustic sources in the local environment of the user wearing the hearing device. In an embodiment, the directional system is adapted to detect (such as adaptively detect) from which direction a particular part of the microphone signal originates. This can be achieved in various different ways as e.g. described in the prior art.

In an embodiment, the hearing device comprises antenna and transceiver circuitry for wirelessly receiving a direct electric input signal from another device, e.g. a communication device or another hearing device.

In an embodiment, the hearing device is (or comprises) a portable device, e.g. a device comprising a local energy source, e.g. a battery, e.g. a rechargeable battery.

The hearing device comprises a forward or signal path between an input transducer (microphone system and/or direct electric input (e.g. a wireless receiver)) and an output transducer. The signal processing unit is located in the forward path. In an embodiment, the hearing device comprises an analysis path comprising functional components for analyzing the input signal (e.g. determining a level, a modulation, a type of signal, an acoustic feedback estimate, etc.). In an embodiment, some or all signal processing of the analysis path and/or the signal path is conducted in the frequency domain. In an embodiment, some or all signal processing of the analysis path and/or the signal path is conducted in the time domain.

In an embodiment, an analogue electric signal representing an acoustic signal is converted to a digital audio signal in an analogue-to-digital (AD) conversion process, where the analogue signal is sampled with a predefined sampling frequency or rate $f_s$, $f_s$ being e.g. in the range from 8 kHz to 40 kHz (adapted to the particular needs of the application) to provide digital samples $x_n$ (or x[n]) at discrete points in time $t_n$ (or n), each audio sample representing the value of the acoustic signal at $t_n$ by a predefined number $N_s$ of bits, $N_s$ being e.g. in the range from 1 to 48 bit, e.g. 24 bits. A digital sample x has a length in time of $1/f_s$, e.g. 50 μs, for $f_s$=20 kHz. In an embodiment, a number of audio samples are arranged in a time frame. In an embodiment, a time frame comprises 64 audio data samples. Other frame lengths may be used depending on the practical application.

In an embodiment, the hearing devices comprise an analogue-to-digital (AD) converter to digitize an analogue input with a predefined sampling rate, e.g. 20 kHz. In an embodiment, the hearing devices comprise a digital-to-analogue (DA) converter to convert a digital signal to an analogue output signal, e.g. for being presented to a user via an output transducer.

In an embodiment, the hearing device, e.g. the microphone unit, and or the transceiver unit comprise(s) a TF-conversion unit for providing a time-frequency representation of an input signal. In an embodiment, the time-frequency representation comprises an array or map of corresponding complex or real values of the signal in question in a particular time and frequency range. In an embodiment, the TF conversion unit comprises a filter bank for filtering a (time varying) input signal and providing a number of (time varying) output (sub-band) signals each comprising a distinct frequency range of the input signal. In an embodiment, the TF conversion unit comprises a Fourier transformation unit (e.g. a DFT or FFT unit) for converting a time variant input signal to a (time variant) signal in the frequency domain. In an embodiment, the frequency range considered by the hearing device from a minimum frequency $f_{min}$ to a maximum frequency $f_{max}$ comprises a part of the typical human audible frequency range from 20 Hz to 20 kHz, e.g. a part of the range from 20 Hz to 12 kHz. In an embodiment, a signal of the forward and/or analysis path of the hearing device is split into a number NI of frequency bands, where NI is e.g. larger than 5, such as larger than 10, such as larger than 50, such as larger than 100, such as larger than 500, at least some of which are processed individually. In an embodiment, the hearing device is/are adapted to process a signal of the forward and/or analysis path in a number NP of different frequency channels (NP≤NI). The frequency channels may be uniform or non-uniform in width (e.g. increasing in width with frequency), overlapping or non-overlapping.

In an embodiment, the hearing device comprises a level detector (LD) for determining the level of an input signal (e.g. on a band level and/or of the full (wide band) signal). The input level of the electric microphone signal picked up from the user's acoustic environment is e.g. a classifier of the environment. In an embodiment, the level detector is adapted to classify a current acoustic environment of the user according to a number of different (e.g. average) signal levels, e.g. as a HIGH-LEVEL or LOW-LEVEL environment.

In a particular embodiment, the hearing device comprises a voice detector (VD) for determining whether or not an input signal comprises a voice (e.g. speech) signal (at a given point in feedback reduction unit time). A voice signal is in the present context taken to include a speech signal from a human being. It may also include other forms of utterances generated by the human speech system (e.g. singing). In an embodiment, the voice detector unit is adapted to classify a current acoustic environment of the user as a VOICE or NO-VOICE environment. This has the advantage that time segments of the electric microphone signal comprising human utterances (e.g. speech) in the user's environment can be identified, and thus separated from time segments only comprising other sound sources (e.g. artificially generated noise). In an embodiment, the voice detector is adapted to detect as a VOICE also the user's own voice. Alternatively, the voice detector is adapted to exclude a user's own voice from the detection of a VOICE.

In an embodiment, the hearing device comprises an own voice detector for detecting whether a given input sound (e.g. a voice) originates from the voice of the user of the system. In an embodiment, the microphone system of the hearing device is adapted to be able to differentiate between a user's own voice and another person's voice and possibly from NON-voice sounds.

In an embodiment, the hearing device comprises an acoustic (and/or mechanical and/or electrical) feedback suppression system. Acoustic feedback occurs because the output loudspeaker signal from an audio system providing amplification of a signal picked up by a microphone is partly returned to the microphone via an acoustic coupling through the air or other media. The part of the loudspeaker signal returned to the microphone is then re-amplified by the system before it is re-presented at the loudspeaker, and again returned to the microphone. As this cycle continues, the effect of acoustic feedback becomes audible as artifacts or even worse, howling, when the system becomes unstable. The problem appears typically when the microphone and the loudspeaker are placed closely together, as e.g. in hearing aids or other audio systems. Some other classic situations with feedback problem are telephony, public address systems, headsets, audio conference systems, etc. Adaptive feedback cancellation has the ability to track feedback path changes over time. It is based on a linear time invariant filter to estimate the feedback path but its filter weights are updated over time. The filter update may be calculated using stochastic gradient algorithms, including some form of the Least Mean Square (LMS) or the Normalized LMS (NLMS) algorithms. They both have the property to minimize the error signal in the mean square sense with the NLMS additionally normalizing the filter update with respect to the squared Euclidean norm of some reference signal.

In an embodiment, the hearing device further comprises other relevant functionality for the application in question, e.g. compression, noise reduction, etc.

Use:

In an aspect, use of a hearing device as described above, in the 'detailed description of embodiments' and in the claims, is moreover provided. In an embodiment, use is provided in a system comprising audio distribution, e.g. a system comprising a microphone and a loudspeaker in sufficiently close proximity of each other to cause feedback from the loudspeaker to the microphone during operation by a user. In an embodiment, use is provided in a system comprising one or more hearing instruments, headsets, ear phones, active ear protection systems, etc., e.g. in handsfree telephone systems, teleconferencing systems, public address systems, karaoke systems, classroom amplification systems, etc.

A Method:

In an aspect, a method of detecting feedback in a hearing device, the hearing device comprising a forward path for processing an electric signal representing sound is provided by the present application. The forward path comprises an input unit for receiving or providing an electric input signal IN representing sound, a signal processing unit for applying a frequency- and/or level-dependent gain to an input signal of the forward path and providing a processed output signal, and an output transducer for generating stimuli perceivable as sound to a user.

The method comprises detecting feedback or evaluating a risk of feedback via an acoustic or mechanical feedback path from said output transducer to said input unit, a loop consisting of said forward path and said acoustic or mechanical or electrical feedback path being defined, the loop exhibiting a loop delay D; by repeatedly determining magnitude Mag and phase Phase of said (e.g. frequency sub-band) electric input signal(s) IN or a processed version thereof;

determining values of loop magnitude (LpMag), loop phase (LpPhase), loop magnitude difference (LpMagDiff), and loop phase difference signals (LpPhaseDiff), respectively, based thereon and on said loop delay D;

checking criteria for magnitude and phase feedback condition, respectively, based on said values of loop magnitude (LpMag), loop phase (LpPhase), loop magnitude difference (LpMagDiff), and loop phase difference signals (LpPhaseDiff), respectively, and providing feedback detection signal, FbDet, indicative of feedback or a risk of feedback.

It is intended that some or all of the structural features of the device described above, in the 'detailed description of embodiments' or in the claims can be combined with embodiments of the method, when appropriately substituted by a corresponding process and vice versa. Embodiments of the method have the same advantages as the corresponding devices.

In an embodiment, the magnitude and phase analysis unit is configured to repeatedly determine magnitude, Mag, and phase, Phase, of said electric input signal IN in dependence of the feedback loop delay D, e.g. with a frequency of $1/zD$, where z is a positive integer. In an embodiment, z=1.

In an embodiment, the magnitude and phase analysis unit is configured to determine magnitude, Mag, and phase, Phase, of said electric input signal IN so that values of the relevant loop parameters (magnitude and phase, etc.) are available with a distance in time of D, e.g. at m'−2D, m'−D, m' (or more generally at m'−2zD, m'−zD, m'). In an embodiment, the magnitude and phase analysis unit is configured to determine magnitude, Mag, and phase, Phase, of said electric input signal IN so that values of the relevant loop parameters are available with a distance in time of a time unit TU of the time-frequency representation of the electric input signal IN.

In an embodiment, the loop consists of said forward path and the acoustic feedback path, the loop exhibiting a loop delay $D_a$. In an embodiment, the loop consists of said forward path and the mechanical feedback path, the loop exhibiting a loop delay $D_m$. In an embodiment, the loop consists of said forward path and the electric feedback path, the loop exhibiting a loop delay $D_e$.

In an embodiment, the method comprises providing an electric input signal IN in a number of frequency sub-band electric input signals IN(k,m), where k and m are frequency sub-band and time indices, respectively.

In an embodiment, the method comprises providing that the loop magnitude and the loop phase at time instant m are determined as $\mathrm{LpMag}(k,m)=\mathrm{Mag}(k,m)-\mathrm{Mag}(k,m_D),$ $\mathrm{LpPhase}(k,m)=\mathrm{wrap}(\mathrm{Phase}(k,m)-\mathrm{Phase}(k,m_D)),$ respectively, where Mag(k,m) and Phase(k,m) are the magnitude and phase (in radians) values, respectively, of the electric input signal IN(k,m) at time m, whereas $Mag(k,m_D)$ and $Phase(k,m_D)$ denotes the magnitude and phase values, respectively, of the electric input signal $IN(k,m_D)$ one feedback loop delay D earlier, and where wrap(.) denotes the phase wrapping operator, the loop phase thus having a possible value range of $[-\pi, \pi]$.

In an embodiment, the method comprises providing that the loop magnitude difference LpMagDiff(k,m) and the loop phase difference LpPhaseDiff(k,m) at time instant m are determined as $$LpMagDiff(k,m)=LpMag(k,m)-LpMag(k,m_D).$$

$$LpPhaseDiff(k,m)=wrap(LpPhase(k,m)-LpPhase(k,m_D)).$$

where LpMag(k,m) and $LpMag(k,m_D)$ are the values of the loop magnitude LpMag at time instant m and at a time instant $m_D$ one feedback loop delay D earlier, respectively, and where LpPhase(k,m) and $LpPhase(k,m_D)$ are the values of the loop phase LpPhase at time instant m and at a time instant $m_D$ one feedback loop delay D earlier, respectively.

A Computer Readable Medium:

In an aspect, a tangible computer-readable medium storing a computer program comprising program code means for causing a data processing system to perform at least some (such as a majority or all) of the steps of the method described above, in the 'detailed description of embodiments' and in the claims, when said computer program is executed on the data processing system is furthermore provided by the present application.

By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. In addition to being stored on a tangible medium, the computer program can also be transmitted via a transmission medium such as a wired or wireless link or a network, e.g. the Internet, and loaded into a data processing system for being executed at a location different from that of the tangible medium.

A Data Processing System:

In an aspect, a data processing system comprising a processor and program code means for causing the processor to perform at least some (such as a majority or all) of the steps of the method described above, in the 'detailed description of embodiments' and in the claims is furthermore provided by the present application.

A Hearing System:

In a further aspect, a hearing system comprising a hearing device as described above, in the 'detailed description of embodiments', and in the claims, AND an auxiliary device is moreover provided.

In an embodiment, the system is adapted to establish a communication link between the hearing device and the auxiliary device to provide that information (e.g. control and status signals, possibly audio signals) can be exchanged or forwarded from one to the other.

In an embodiment, the auxiliary device is or comprises an audio gateway device adapted for receiving a multitude of audio signals (e.g. from an entertainment device, e.g. a TV or a music player, a telephone apparatus, e.g. a mobile telephone or a computer, e.g. a PC) and adapted for selecting and/or combining an appropriate one of the received audio signals (or combination of signals) for transmission to the hearing device. In an embodiment, the auxiliary device is or comprises a remote control for controlling functionality and operation of the hearing device(s). In an embodiment, the function of a remote control is implemented in a SmartPhone, the SmartPhone possibly running an APP allowing to control the functionality of the audio processing device via the SmartPhone (the hearing device(s) comprising an appropriate wireless interface to the SmartPhone, e.g. based on Bluetooth or some other standardized or proprietary scheme).

In an embodiment, the auxiliary device is another hearing device. In an embodiment, the hearing system comprises two hearing devices adapted to implement a binaural hearing system, e.g. a binaural hearing aid system.

An APP:

In a further aspect, a non-transitory application, termed an APP, is furthermore provided by the present disclosure. The APP comprises executable instructions configured to be executed on an auxiliary device to implement a user interface for a hearing device or a hearing system described above in the 'detailed description of embodiments', and in the claims. In an embodiment, the APP is configured to run on cellular phone, e.g. a smartphone, or on another portable device allowing communication with said hearing device or said hearing system.

DEFINITIONS

In the present context, a 'hearing device' refers to a device, such as e.g. a hearing instrument or an active ear-protection device or other audio processing device, which is adapted to improve, augment and/or protect the hearing capability of a user by receiving acoustic signals from the user's surroundings, generating corresponding audio signals, possibly modifying the audio signals and providing the possibly modified audio signals as audible signals to at least one of the user's ears. A 'hearing device' further refers to a device such as an earphone or a headset adapted to receive audio signals electronically, possibly modifying the audio signals and providing the possibly modified audio signals as audible signals to at least one of the user's ears. Such audible signals may e.g. be provided in the form of acoustic signals radiated into the user's outer ears, acoustic signals transferred as mechanical vibrations to the user's inner ears through the bone structure of the user's head and/or through parts of the middle ear as well as electric signals transferred directly or indirectly to the cochlear nerve of the user.

The hearing device may be configured to be worn in any known way, e.g. as a unit arranged behind the ear with a tube leading radiated acoustic signals into the ear canal or with a loudspeaker arranged close to or in the ear canal, as a unit entirely or partly arranged in the pinna and/or in the ear canal, as a unit attached to a fixture implanted into the skull bone, as an entirely or partly implanted unit, etc. The hearing device may comprise a single unit or several units communicating electronically with each other.

More generally, a hearing device comprises an input transducer for receiving an acoustic signal from a user's surroundings and providing a corresponding input audio signal and/or a receiver for electronically (i.e. wired or wirelessly) receiving an input audio signal, a (typically configurable) signal processing circuit for processing the input audio signal and an output means for providing an audible signal to the user in dependence on the processed audio signal. In some hearing devices, an amplifier may constitute the signal processing circuit. The signal processing circuit typically comprises one or more (integrated or separate) memory elements for executing programs and/or for storing parameters used (or potentially used) in the processing and/or for storing information relevant for the function of the hearing device, and/or for storing information (e.g. processed information, e.g. provided by the signal processing circuit), e.g. for use in connection with an interface to a user and/or an interface to a programming device. In some hearing devices, the output means may comprise an output transducer, such as e.g. a loudspeaker for providing an air-borne acoustic signal or a vibrator for providing a structure-borne or liquid-borne acoustic signal. In some hearing devices, the output means may comprise one or more output electrodes for providing electric signals.

In some hearing devices, the vibrator may be adapted to provide a structure-borne acoustic signal transcutaneously or percutaneously to the skull bone. In some hearing devices, the vibrator may be implanted in the middle ear and/or in the inner ear. In some hearing devices, the vibrator may be adapted to provide a structure-borne acoustic signal to a middle-ear bone and/or to the cochlea. In some hearing devices, the vibrator may be adapted to provide a liquid-borne acoustic signal to the cochlear liquid, e.g. through the oval window. In some hearing devices, the output electrodes may be implanted in the cochlea or on the inside of the skull bone and may be adapted to provide the electric signals to the hair cells of the cochlea, to one or more hearing nerves, to the auditory brainstem, to the auditory midbrain, to the auditory cortex and/or to other parts of the cerebral cortex.

A 'hearing system' refers to a system comprising one or two hearing devices, and a 'binaural hearing system' refers to a system comprising two hearing devices and being adapted to cooperatively provide audible signals to both of the user's ears. Hearing systems or binaural hearing systems may further comprise one or more 'auxiliary devices', which communicate with the hearing device(s) and affect and/or benefit from the function of the hearing device(s). Auxiliary devices may be e.g. remote controls, audio gateway devices, mobile phones (e.g. SmartPhones), public-address systems, car audio systems or music players. Hearing devices, hearing systems or binaural hearing systems may e.g. be used for compensating for a hearing-impaired person's loss of hearing capability, augmenting or protecting a normal-hearing person's hearing capability and/or conveying electronic audio signals to a person.

Embodiments of the disclosure may e.g. be useful in applications such as hearing aids, headsets, ear phones, active ear protection systems, etc. The disclosure may further be useful in applications such as handsfree telephone systems, mobile telephones, teleconferencing systems, public address systems, karaoke systems, classroom amplification systems.

BRIEF DESCRIPTION OF DRAWINGS

The aspects of the disclosure may be best understood from the following detailed description taken in conjunction with the accompanying figures. The figures are schematic and simplified for clarity, and they just show details to improve the understanding of the claims, while other details are left out. Throughout, the same reference numerals are used for identical or corresponding parts. The individual features of each aspect may each be combined with any or all features of the other aspects. These and other aspects, features and/or technical effect will be apparent from and elucidated with reference to the illustrations described hereinafter in which:

The figures are schematic and simplified for clarity, and they just show details which are essential to the understanding of the disclosure, while other details are left out. Throughout, the same reference signs are used for identical or corresponding parts.

Further scope of applicability of the present disclosure will become apparent from the detailed description given hereinafter. However, it should be understood that the detailed description and specific examples, while indicating preferred embodiments of the disclosure, are given by way of illustration only. Other embodiments may become apparent to those skilled in the art from the following detailed description.

DETAILED DESCRIPTION OF EMBODIMENTS

The detailed description set forth below in connection with the appended drawings is intended as a description of various configurations. The detailed description includes specific details for the purpose of providing a thorough understanding of various concepts. However, it will be apparent to those skilled in the art that these concepts may be practiced without these specific details. Several aspects of the apparatus and methods are described by various blocks, functional units, modules, components, circuits, steps, processes, algorithms, etc. (collectively referred to as "elements"). Depending upon particular application, design constraints or other reasons, these elements may be implemented using electronic hardware, computer program, or any combination thereof.

The electronic hardware may include microprocessors, microcontrollers, digital signal processors (DSPs), field programmable gate arrays (FPGAs), programmable logic devices (PLDs), gated logic, discrete hardware circuits, and other suitable hardware configured to perform the various functionality described throughout this disclosure. Computer program shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The present application relates to the field of hearing devices, e.g. hearing aids. The disclosure deals in particular with concepts for ultrafast feedback estimation. The estimation is based on the amplitude, phase, and their variations over time and frequency of the forward path of a hearing device, e.g. a hearing aid.

Time and Frequency:
  time index n is generally used for a (digital) time domain signal, e.g., IN(n) means the signal IN at time index n;
  the time/frequency domain index m is generally used as a time frame index and k is used as a frequency index;
  for analogue signals (before A/D-conversion), t is generally used (e.g. IN(t)), where t denotes the continuous time.

Figure 1:
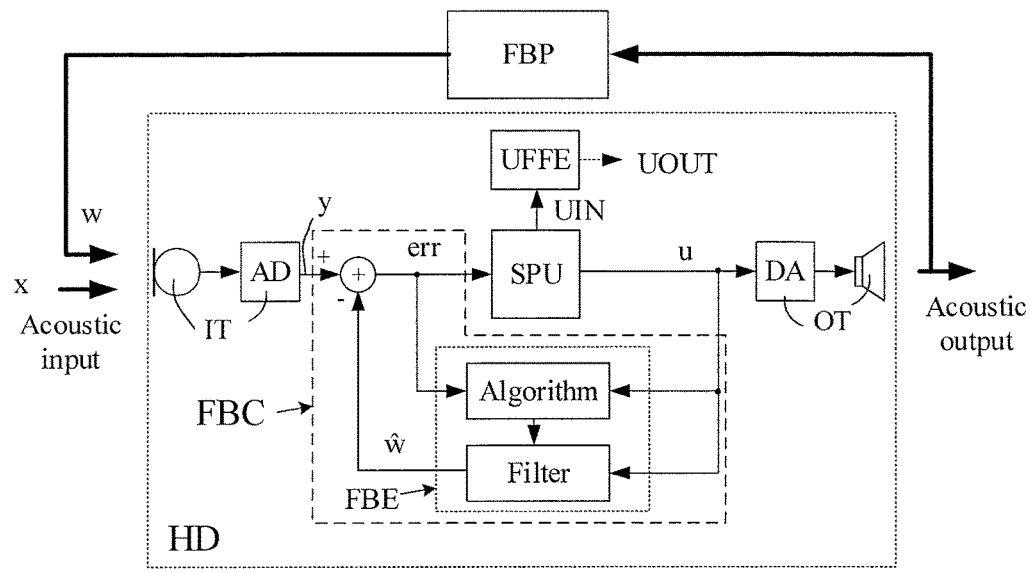
FIG. 1 shows a simplified block diagram of an embodiment of a hearing device comprising a feedback detector according to the present disclosure.

FIG. 1 shows a simplified block diagram of an embodiment of a hearing device comprising a feedback detector according to the present disclosure. The simplified block diagram of hearing device (HD) illustrates a forward path (from input transducer (IT) to output transducer (OT)) for processing an input sound signal and providing a processed output signal. The hearing device further comprises a feedback cancellation system FBC for estimating and cancelling (at least decreasing) the contribution of feedback from output to input transducer in the signal of the forward path. The feedback cancellation system FBC comprises a feedback estimation unit FBE for estimating a current feedback path from output transducer to input transducer (through the feedback path FBP) and providing a feedback estimate signal ŵ. The feedback cancellation system FBC further comprises a combination unit (here summation unit '+') for combining the feedback estimate signal ŵ with the electric input signal y from the input transducer IT (here subtracting ŵ from y) to provide a feedback corrected signal err, which is fed to the signal processing unit SPU and the feedback estimation unit FBE. The hearing device HD further comprises feedback detection unit UFFE for detecting critical feedback situations based on a signal of the forward path UIN (here tapped from signal processing unit SPU) and providing feedback detection signal UOUT. The hearing device HD further comprises signal processing unit for processing feedback corrected signal err and providing a processed signal u which is fed to the output transducer OT for presentation to the user and to the feedback cancellation unit FBC. The feedback detection signal UOUT may e.g. be used in the signal processing unit SPU (e.g. to control a gain in the signal processing unit) and/or in the feedback cancellation unit FBC (e.g. to control an adaptation rate of the feedback estimation unit FBE).

Figure 2:
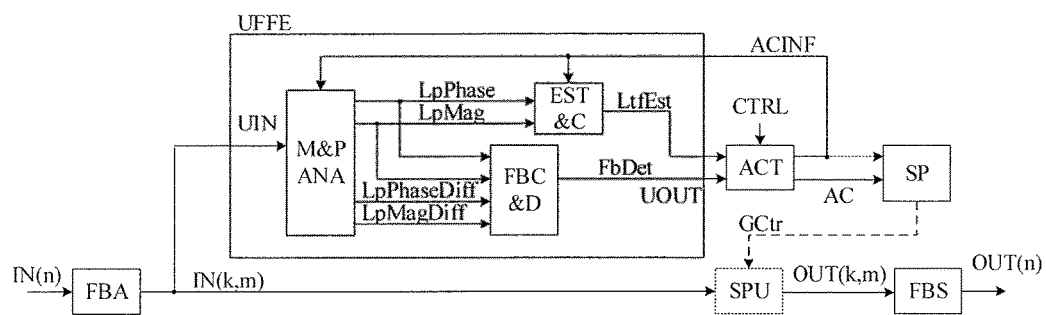
FIG. 2 shows a block diagram of a first embodiment of a feedback detector according to the present disclosure in a sound processing environment, FIG. 3 schematically illustrates the composition of loop delay in an audio processing device, e.g. a hearing device.

FIG. 2 shows a block diagram of a first embodiment of a feedback detector according to the present disclosure in a sound processing environment. The block diagram of FIG. 2 may form part of a hearing device receiving an electric, time-variant input signal IN(n) representing sound, where n is time, e.g. a time index. The hearing device comprises an analysis filter bank FBA for converting the time variant input signal IN(n) to a number of (time-variant) sub-band signals IN(k,m), where k is a frequency index (k=1, . . . , K) and m is a time (frame) index. The hearing device may e.g. comprise a gain unit G for applying a frequency and/or level dependent gain IG ($0 \leq IG \leq IG_{max}$), e.g. adapted to a user's needs, e.g. hearing impairment. The gain unit provides a processed signal OUT(k,m) that is fed to a synthesis filter bank FBS and converted to a time variant (full-band) output signal OUT(n), which may be forwarded to another device and/or presented to one or more users. In a hearing aid setup, the input signal IN(n) may e.g. be provided by an input unit, e.g. an input transducer IT (cf. FIG. 1). Likewise, the output signal OUT(n) may be fed to an output transducer OT (cf. FIG. 1). The signal path from the input transducer to the output transducer (IN(n) to OUT(n)) constitutes a forward path of the hearing device. The hearing device further comprises a feedback detector, Ultra Fast Feedback Estimator (UFFE), according to the present disclosure for providing a feedback detection control signal UOUT and a loop transfer function control signal LtfEst, and an action unit ACT for performing an action based on the inputs UOUT and LtfEst from the feedback detector. The action unit ACT provides an action information signal ACINF that is fed back to the feedback detector UFFE and may be used to improve the feedback detection. The action information signal ACINF may be used by other parts of the hearing device as well to modify conditions or modes of operation of the hearing device (indicated by its connection to processing unit SP, cf. dashed input to the SP unit). Actions taken based on the signals from the feedback detector (e.g. to reduce feedback), cf. signal AC to the processing unit SP may e.g. include a gain reduction in the forward path (cf. signal GCtr to gain unit G), and/or the introduction or modification of a (small) frequency shift in the forward path to de-correlate input from output, etc.

In some of the calculations performed in the feedback detector UFFE, subsequent values of parameters such as loop magnitude and loop phase are determined at time instances in units of one loop delay. Hence, knowledge (e.g. an estimate or a measurement) of the length of one loop delay is assumed to be available.

Figure 3:
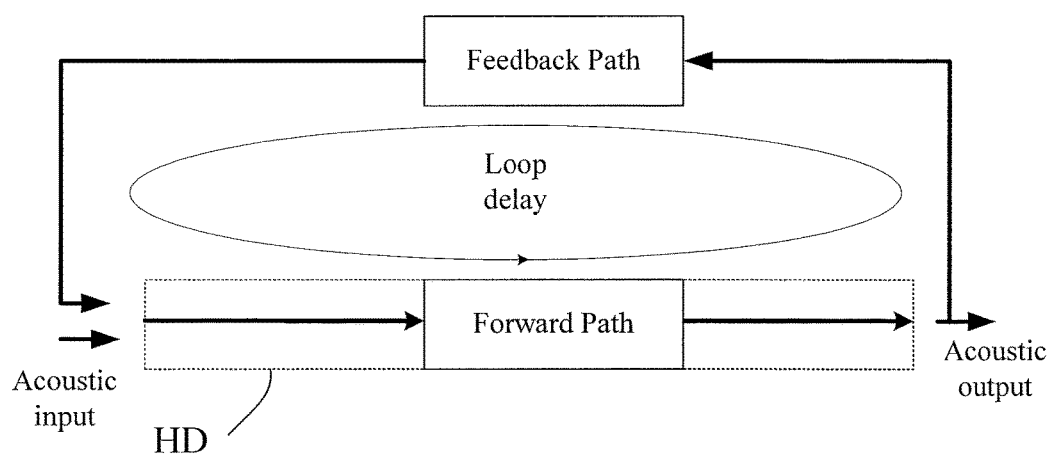

The loop delay is defined as the time required for the signal travelling through the acoustic loop, as illustrated in FIG. 3. The acoustic loop consists of the forward path (HD), and the feedback path. The loop delay is taken to include the processing delay d of the (electric) forward path of the hearing device from input transducer to output transducer and the delay d' of the acoustic feedback path from the output transducer to the input transducer of the hearing device, LoopDelay D=d+d'.

Typically, the acoustic part d' of the loop delay is much less than the electric (processing) part d of the loop delay, d'<<d. In an embodiment the electric (processing) part d of the loop delay is in the range between 2 ms and 10 ms, e.g. in the range between 5 ms and 8 ms, e.g. around 7 ms. The loop delay may be relatively constant over time (and e.g. determined in advance of operation of the hearing device) or be different at different points in time, e.g. depending on the currently applied algorithms in the signal processing unit (e.g. dynamically determined (estimated) during use). The hearing device (HD) may e.g. comprise a memory unit wherein typical loop delays in different modes of operation of the hearing device are stored. In an embodiment, the hearing device is configured to measure a loop delay comprising a sum of a delay of the forward path and a delay of the feedback path. In an embodiment, a predefined test-signal is inserted in the forward path, and its round trip travel time measured (or estimated), e.g. by identification of the test signal when it arrives in the forward path after a single propagation (or a known number of propagations) of the loop.

The function of the individual units of the feedback detector (UFFE) is described in following.

The Magnitude and Phase Analysis Unit M&PANA:

The magnitude and phase analysis unit M&PANA takes as an input signal frequency sub-band signals of the forward path, here the signal IN(k,m), and comprises an accumulation and down-sampling unit and a linear to log domain transformation unit (not shown in FIG. 2).

First, the magnitude and phase of the frequency sub-band signals are determined.

The outputs from the magnitude and phase analysis unit M&PANA are loop magnitude, loop phase, loop magnitude difference, and loop phase difference signals (i.e. signals LpMag, LpPhase, LpMagDiff, and LpPhaseDiff, respectively).

The loop magnitude (in the log domain, also termed 'loop gain') $LpMag(k,m)$ at the frequency index k and time index m is computed as:

$$LpMag(k,m) = Mag(k,m) - Mag(k,m_D),$$

where $Mag(k,m)$ is the current magnitude value of the signal, whereas $m_D$ denotes the index one feedback loop delay earlier (the correct time frame index $m_D$ can be a decimal number, and a rounding might be needed to obtain the closest integer frame index of $m_D$). The corresponding output signal of the M&PANA unit is termed LpMag in FIG. 2.

The loop magnitude difference $LpMagDiff(k,m)$ is computed as $$LpMagDiff(k,m) = LpMag(k,m) - LpMag(k,m_D).$$

The corresponding output signal of the M&PANA unit is termed LpMagDiff in FIG. 2.

The loop phase (in radian) is computed as $$LpPhase(k,m) = wrap(Phase(k,m) - Phase(k,m_D)),$$

where wrap(.) denotes the phase wrapping operator, the loop phase thus has a possible value range of $[-\pi, \pi]$, and Phase(k,m) is the current phase value of the signal. The corresponding output signal of the M&PANA unit is termed LpPhase in FIG. 2.

The loop phase difference $LpPhaseDiff(k,m)$ is computed as $$LpPhaseDiff(k,m) = wrap(LpPhase(k,m) - LpPhase(k, m_D)).$$

The loop phase difference thus has a possible value range of $[-\pi, \pi]$, and the corresponding output signal of the M&PANA unit is termed LgPhaseDiff in FIG. 2.

In an embodiment, several of subsequent magnitude and phase values and/or loop magnitude difference or loop phase difference over a period corresponding to the feedback loop delay are accumulated and decimated so that there is one magnitude and phase value and/or loop magnitude difference or loop phase difference value for each time period corresponding to the feedback loop delay.

The Feedback Conditions and Detection Unit FBC&D:

The feedback conditions and detection unit FBC&D takes as inputs, signals LpMag, LpPhase, LpMagDiff, and LpPhaseDiff, respectively, from the magnitude and phase analysis unit M&PANA. The output from the feedback conditions and detection unit FBC&D is the feedback detection signal (signal FbDet or UOUT).

The feedback conditions and detection unit FBC&D is configured to check magnitude and phase conditions for feedback.

The magnitude feedback detection, based on the magnitude condition, is defined as:

$$LpMagDet(k,m) = min(LpMag(k,m), \ldots, LpMag(k, m_{N-D})) > MagThresh,$$

where MagThresh is a threshold value close to zero, such as $-3, -2, -1, 0, 1, 2, 3 \ldots$. The index $m_{N-D}$ denotes the time index N feedback loop delays earlier Example values of N can be $0, 1, 2, \ldots$. The magnitude feedback detection signal LpMagDet is e.g. a binary signal (0 or 1).

The phase feedback detection, based on the phase condition, is defined as:

$$LpPhaseDet(k,m) = abs(LpPhase(k,m)) < PhaseThresh,$$

where PhaseThresh is a threshold value close to zero, such as $0.5, 0.4, 0.3, 0.2, 0.1, 0.05, 0.01 \ldots$. The phase feedback detection signal LpPhaseDet is e.g. a binary signal (0 or 1). Alternatively, the phase feedback detection, based on the phase difference condition, is defined as:

$$LpPhaseDet(k,m) = abs(LpPhase(k,m)) < PhaseDiffThresh,$$

whereas PhaseDiffThresh is a threshold value close to zero, such as $0.5, 0.4, 0.3, 0.2, 0.1, 0.05, 0.01 \ldots$.

In principle, for the phase feedback detection, we should ideally use the loop phase signal LpPhase, i.e., the loop phase has to be close to 0. However, due to the loop phase estimation is highly depended on the feedback loop delay, and small deviation in loop delay can cause a significantly biased loop phase estimate. Hence, we can use the loop phase difference LpPhaseDiff to compensate for the possible bias in loop phase estimate.

The feedback detection is then determined based on magnitude and phase feedback detections as $$FbDet(k,m) = and (LpMagDet(k,m), LpPhaseDet(k,m)).$$

The feedback detection signal FbDet is e.g. a binary signal (0 or 1).

Figure 4A:
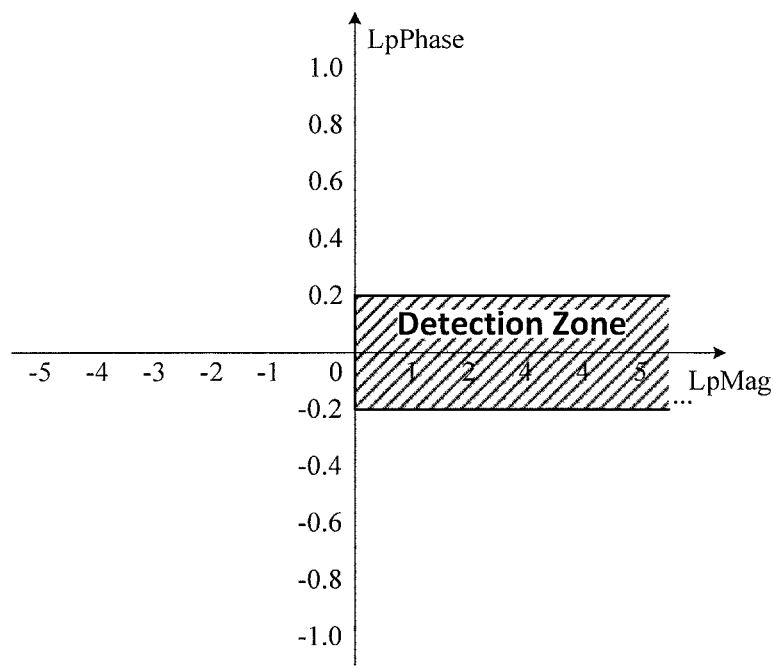
FIG. 4A shows a criterion for feedback detection determined based on a combination of the criteria for loop magnitude and loop phase feedback conditions as $FbDet(k,m)$=and $(LpMagDet(k,m), LpPhaseDet(k,m))$.
Figure 4B:
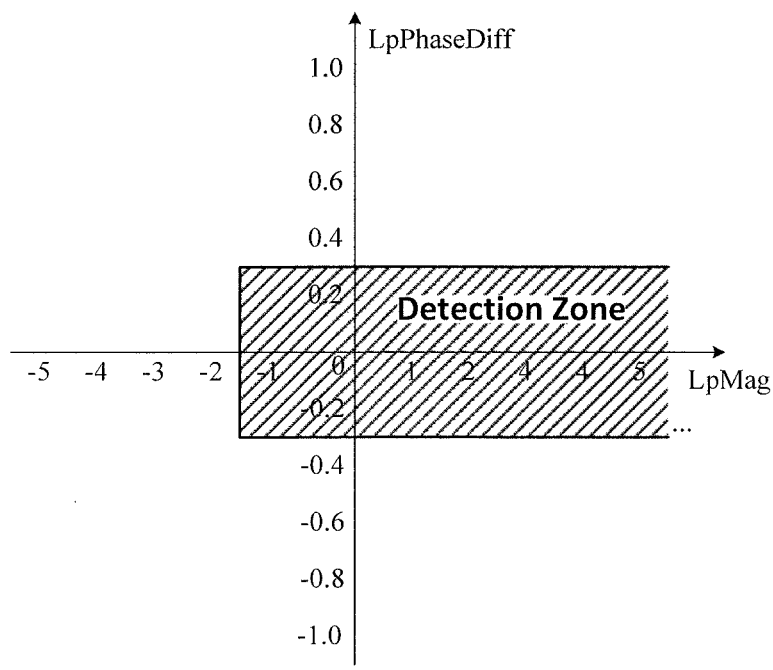
FIG. 4B shows a criterion for feedback detection determined based on a combination of criteria for loop magnitude (LpMag) and loop phase difference (LpPhaseDiff) feedback conditions, $FbDet(k,m)$=and $(LpMagDet(k,m), LpPhaseDiffDet(k,m))$.

Two example feedback detection zones are illustrated in FIG. 4A and FIG. 4B. In the FIG. 4A, the detection is based on LpMag and LpPhase, with the respective range LpMag>0, and abs(LpPhase)<0.2. FIG. 4B illustrates an example of detection based on LpMag and LpPhaseDiff, where LpMag>-1.5, and abs(LpPhaseDiff)<0.3.

The feedback detection signal FbDet(k,m) can be further modified by considering the loop gain difference signal LpMagDiff(k,m). Table 1 illustrates how different values of LpMagDiff(k,m) can be interpreted and used to improve the feedback detection.

TABLE 1

The indications from the loop magnitude signal LpMagDiff(k, m).

| LpMagDiff(k, m) | Explanation | Possible Actions |
| --- | --- | --- |
| >0 | The loop magnitude is raising | Confirm feedback detection |
| ~=0 | The loop magnitude is constant | If a preventive action was already applied, we expect a change in loop magnitude, this can indicate false-detection |
| <0 | The loop magnitude is decreasing | No feedback detection necessary |

The Loop Transfer Function Estimation and Correction Unit EST&C:

The loop transfer function estimation and correction unit EST&C takes as inputs the signals LpMag and LpPhase, and provides the output complex signal LtfEst comprising magnitude (LpMagEst) and phase (LpPhaseEst) of the estimated loop transfer function. The input ACINF is used to correct the loop transfer function estimate, if a preventive action is applied upon feedback detection, and this action affects the loop transfer function.

The loop transfer function consists of two parts, the loop magnitude and phase.

The loop magnitude estimate LpMagEst(k,m) is computed as the linear combination of latest P values of LpMag (k,m), $$LpMagEst(k, m) = \sum_{p=0}^{P-1} \alpha_p \cdot LpMag(k, m - p),$$

where $\alpha_p$ are non-negative scaling factors, and $\Sigma \alpha_p = 1$. Example values of P and $\alpha_p$ can be P=2, and $\alpha_0 = \alpha_1 = 0.5$. In an embodiment, P=4 and $\alpha_0 = 0.5$, $\alpha_1 = 0.25$, $\alpha_2 = 0.125$, $\alpha_3 = 0.125$.

Similarly, the loop phase estimate LpPhaseEst(k,m) is computed as the linear combination of latest Q values of LpPhase(k,m), $$LpPhaseEst(k, m) = \sum_{q=0}^{Q-1} a_q \cdot LpPhase(k, m - q).$$

The (complex) estimate of the loop transfer function can then be written as $$LtfEst(k,m) = LpMagEst(k,m)e^{j \cdot LpPhaseEst(k,m)}$$

The above expressions are stated in the time-frequency domain (indices k,m) but may alternatively be expressed in the time domain (index n) by substitution.

The signal ACINF is used to correct the loop transfer function estimate, when a potential action upon feedback detection can affect the estimate itself. More details are given in the section ACT.

The function of the activation unit ACT is described in following.

The Action Information Unit ACT:

The action information unit ACT takes as inputs the feedback detection signal FbDet and the loop transfer function estimate LtfEst and provides as an output an action information signal ACINF.

Whenever some actions are taken due to feedback detection, this action can potentially affect the feedback detection itself. E.g., when the frequency shift is applied, it modifies the loop phase, and hence this information should be taken into account when detecting the phase feedback.

Or the action information is used as part of the feedback detection, e.g., as a "gain-reduction-test" or "phase-change-test" method. In this case, a gain reduction or a phase change of a certain amount is applied in the forward path upon feedback detection. In the case of a correct feedback detection based on the loop magnitude and loop phase estimates, a reduction of loop magnitude or a phase change by the same amount should be observed. This can be used as a confirmation of feedback detection.

However, in the case that a false feedback detection due to incorrectly estimated loop magnitude and/or phase, as a consequence of, e.g., autocorrelation in the incoming signal of the hearing device, we would very likely not observe a gain reduction or a phase change, at least not by the same amount of the reduced gain or modified phase. In this case, we would declare false detection.

Generally, the action information signal can be used to improve the feedback detection (e.g. its confidence or validity). The actual use of the action information signal in order to improve the feedback detection signal depends on the action.

The action information unit ACT is configured to receive information about the current (estimate) of the loop transfer function (LtfEst) AND the current feedback detection (FbDet, 0 or 1). Based on this information the action information unit ACT decides on appropriate actions (reduction of gain, increase adaptation rate of the feedback estimation, the application of frequency shift in the forward path, or the like) and initiates such actions.

The action information unit ACT takes also as the input control signal CTRL, which can be used to start/stop actions independent of the feedback detection signal FbDet.

Figure 5:
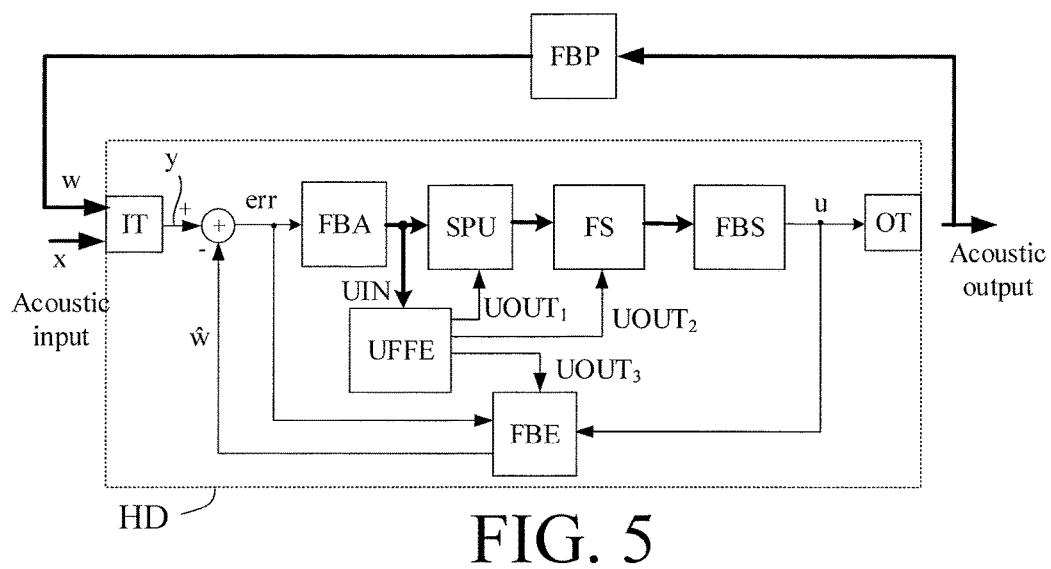
FIG. 5 shows a simplified block diagram of an embodiment of a hearing device comprising a feedback detector according to the present disclosure when used to control various processing parts of the hearing device.

FIG. 5 shows a simplified block diagram of an embodiment of a hearing device comprising a feedback detector according to the present disclosure when used to control various processing parts of the hearing device. The embodiment of hearing device of FIG. 5 is similar to the embodiment of FIG. 1. In the embodiment of FIG. 5, however, a processing part of the forward path around the signal processing unit SPU is carried out in frequency sub-bands. The forward path hence comprises a filter bank (analysis filter bank FBA before the signal processing unit SPU and synthesis filter bank FBS before the output transducer OT). The forward path further comprises a configurable decorrelation unit FS in the forward path, e.g. in the form of a frequency shift $\Delta f$ (e.g. $\Delta f < 10$ Hz). The feedback detector is configured to provide individual control signals $UOUT_1$, $UOUT_2$, and $UOUT_3$ to the signal processing unit SPU, to the frequency shifting unit FS and to the feedback estimation unit FBE, respectively. Based on the current feedback detection signal (and other parameters available in the feedback detection unit UFFE), the control signals $UOUT_p$, p=1, 2, 3 are e.g. configured to control 1) a gain (in one or more frequency sub-bands) applied by the signal processing unit, 2) whether or not to apply a frequency shift (and/or an amount of frequency shift) by the decorrelation unit FS, and 3) whether or not to update a current feedback estimate (and/or to control an adaptation rate of an adaptive algorithm) by the feedback estimation unit (FBE).

Figure 6:
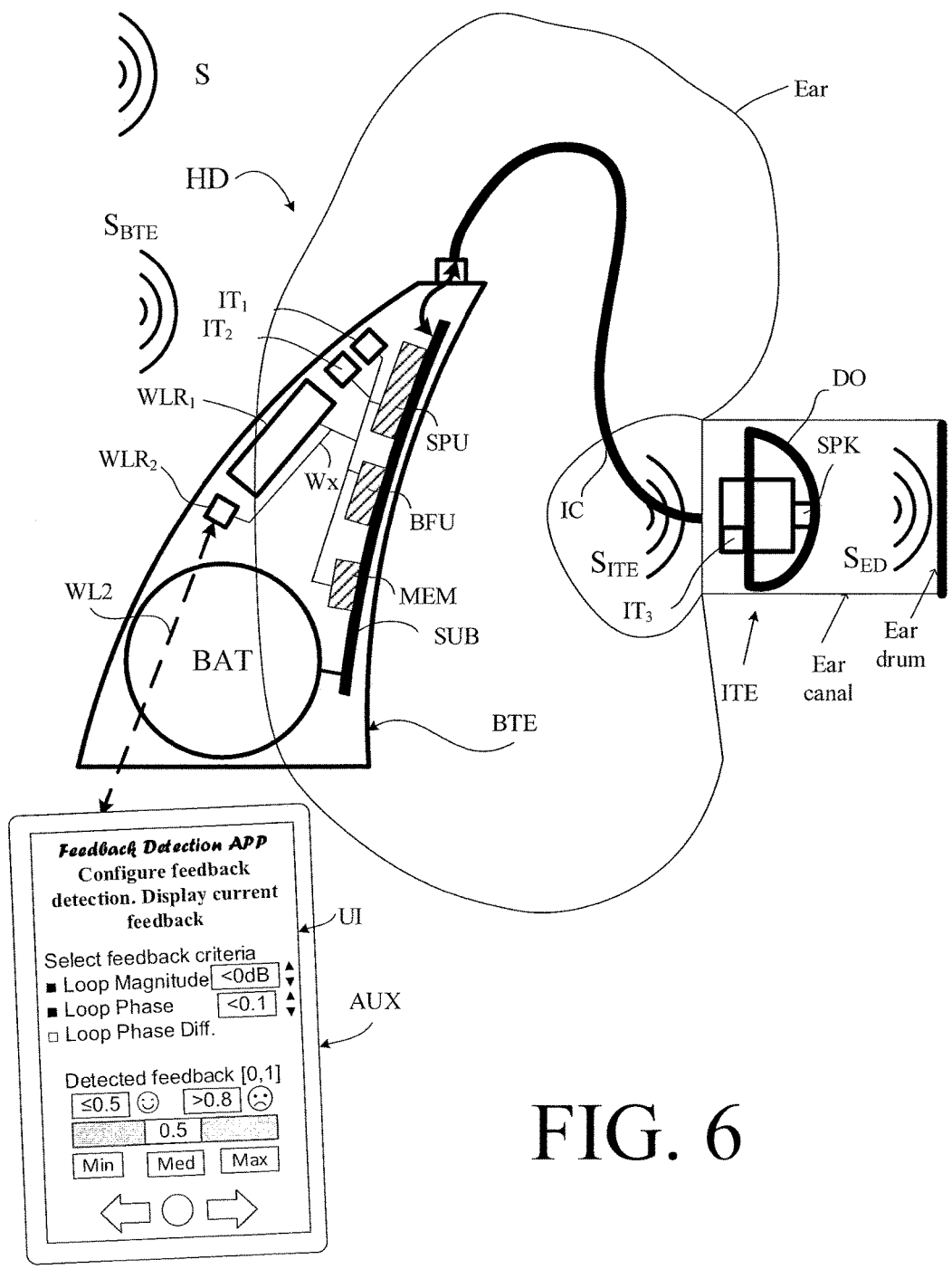
FIG. 6 shows an embodiment of a hearing system comprising a hearing device and an auxiliary device in communication with each other.

FIG. 6 shows an embodiment of a hearing system comprising a hearing device and an auxiliary device in communication with each other. FIG. 6 shows an embodiment of a hearing aid according to the present disclosure comprising a BTE-part located behind an ear or a user and an ITE part located in an ear canal of the user.

FIG. 6 illustrates an exemplary hearing aid (HD) formed as a receiver in the ear (RITE) type hearing aid comprising a BTE-part (BTE) adapted for being located behind pinna and a part (ITE) comprising an output transducer (e.g. a loudspeaker/receiver, SPK) adapted for being located in an ear canal (Ear canal) of the user (e.g. exemplifying a hearing aid (HD) as shown in FIG. 1 or 5). The BTE-part (BTE) and the ITE-part (ITE) are connected (e.g. electrically connected) by a connecting element (IC). In the embodiment of a hearing aid of FIG. 5, the BTE part (BTE) comprises two input transducers (here microphones) ($IT_1$, $IT_2$) each for providing an electric input audio signal representative of an input sound signal ($S_{BTE}$) from the environment. In the scenario of FIG. 6, the input sound signal $S_{BTE}$ includes a contribution from sound source S. The hearing aid of FIG. 6 further comprises two wireless receivers ($WLR_1$, $WLR_2$) for providing respective directly received auxiliary audio and/or information signals. The hearing aid (HD) further comprises a substrate (SUB) whereon a number of electronic components are mounted, functionally partitioned according to the application in question (analogue, digital, passive components, etc.), but including a configurable signal processing unit (SPU), a beam former filtering unit (BFU), and a memory unit (MEM) coupled to each other and to input and output transducers via electrical conductors Wx. The mentioned functional units (as well as other components) may be partitioned in circuits and components according to the application in question (e.g. with a view to size, power consumption, analogue vs. digital processing, etc.), e.g. integrated in one or more integrated circuits, or as a combination of one or more integrated circuits and one or more separate electronic components (e.g. inductor, capacitor, etc.). The configurable signal processing unit (SPU) provides an enhanced audio signal, which is intended to be presented to a user. In the embodiment of a hearing aid device in FIG. 6, the ITE part (ITE) comprises an output unit in the form of a loudspeaker (receiver) (SPK) for converting the electric signal (OUT) to an acoustic signal (providing, or contributing to, acoustic signal $S_{ED}$ at the ear drum (Ear drum). In an embodiment, the ITE-part further comprises an input unit comprising an input transducer (e.g. a microphone) ($IT_3$) for providing an electric input audio signal representative of an input sound signal $S_{ITE}$ from the environment (including from sound source S) at or in the ear canal. In another embodiment, the hearing aid may comprise only the BTE-microphones ($IT_1$, $IT_2$). In another embodiment, the hearing aid may comprise only the ITE-microphone ($IT_3$). In yet another embodiment, the hearing aid may comprise an input unit ($IT_4$) located elsewhere than at the ear canal in combination with one or more input units located in the BTE-part and/or the ITE-part. The ITE-part further comprises a guiding element, e.g. a dome, (DO) for guiding and positioning the ITE-part in the ear canal of the user.

The hearing aid (HD) exemplified in FIG. 6 is a portable device and further comprises a battery (BAT) for energizing electronic components of the BTE- and ITE-parts.

The hearing aid (HD) may e.g. comprise a directional microphone system (beam former filtering unit (BFU)) adapted to spatially filter a target acoustic source among a multitude of acoustic sources in the local environment of the user wearing the hearing aid device. In an embodiment, the directional system is adapted to detect (such as adaptively detect) from which direction a particular part of the microphone signal (e.g. a target part and/or a noise part) originates. In an embodiment, the beam former filtering unit is adapted to receive inputs from a user interface (e.g. a remote control or a smartphone) regarding the present target direction. The memory unit (MEM) may e.g. comprise predefined (or adaptively determined) complex, frequency dependent constants ($W_{ij}$) defining predefined or (or adaptively determined) 'fixed' beam patterns (e.g. omni-directional, target cancelling, etc.), together defining the beamformed signal $Y_{BF}$.

The hearing aid of FIG. 6 may constitute or form part of a hearing aid and/or a binaural hearing aid system according to the present disclosure. The hearing aid comprises a feedback detection unit as described above. The processing of an audio signal in a forward path of the hearing aid may e.g. be performed fully or partially in the time-frequency domain. Likewise, the processing of signals in an analysis or control path of the hearing aid may be fully or partially performed in the time-frequency domain.

The hearing aid (HD) according to the present disclosure may comprise a user interface UI, e.g. as shown in FIG. 6 implemented in an auxiliary device (AUX), e.g. a remote control, e.g. implemented as an APP in a smartphone or other portable (or stationary) electronic device. In the embodiment of FIG. 6, the screen of the user interface (UI) illustrates a Feedback Detection APP, with the subtitle 'Configure feedback detection. Display current feedback' (upper part of the screen). Criteria for detecting feedback can be configured by the user via the APP (middle part of screen denoted 'Select feedback criteria'). The feedback criteria can be selected between a number of criteria, here between 'Loop Magnitude', 'Loop Phase' and 'Loop Phase Difference'. In the screen shown in FIG. 6, criteria 'Loop Magnitude' and 'Loop Phase' have been selected (as indicated by solid symbols ■), and the user can then set threshold values for these two criteria, increasing or decreasing selected values by activating black arrows to the right, ▲=increase, ▼=decrease). The user has selected a loop magnitude threshold value of 0 dB, and a loop phase threshold value of 0.1 (rad). The current feedback situation determined using the selected criteria is displayed (lower part of screen, denoted 'Detected feedback [0, 1,]'). A value between 0 and 1 is used to indicate a degree of severity of the current feedback (overall, although determined on a frequency sub-band level). The legend is indicated as OK (☺) for values below 0.5 and as critical (☹) for values above 0.8. The current value of (relative) feedback is illustrated by a number (here 0.5) at a corresponding location on the horizontal grey bar (to a value between a minimum value (Min corresponding to 0) and a maximum value (Max corresponding to 1) with a medium value (Med corresponding to 0.5) there between). The arrows at the bottom of the screen allow changes to a preceding and a proceeding screen of the APP, and a tab on the circular dot between the two arrows brings up a menu that allows the selection of other APPs or features of the device. In an embodiment, the APP is configured to provide an (possibly graphic) illustration of the current feedback detection (e.g. signal FbDet(k,m)) on a frequency sub-band level, e.g. relative to a current feedback margin.

The auxiliary device and the hearing aid are adapted to allow communication of data representative of the currently selected direction (if deviating from a predetermined direction (already stored in the hearing aid)) to the hearing aid via a, e.g. wireless, communication link (cf. dashed arrow WL2 in FIG. 6). The communication link WL2 may e.g. be based on far field communication, e.g. Bluetooth or Bluetooth Low Energy (or similar technology), implemented by appropriate antenna and transceiver circuitry in the hearing aid (HD) and the auxiliary device (AUX), indicated by transceiver unit $WLR_2$ in the hearing aid.

Figure 7:
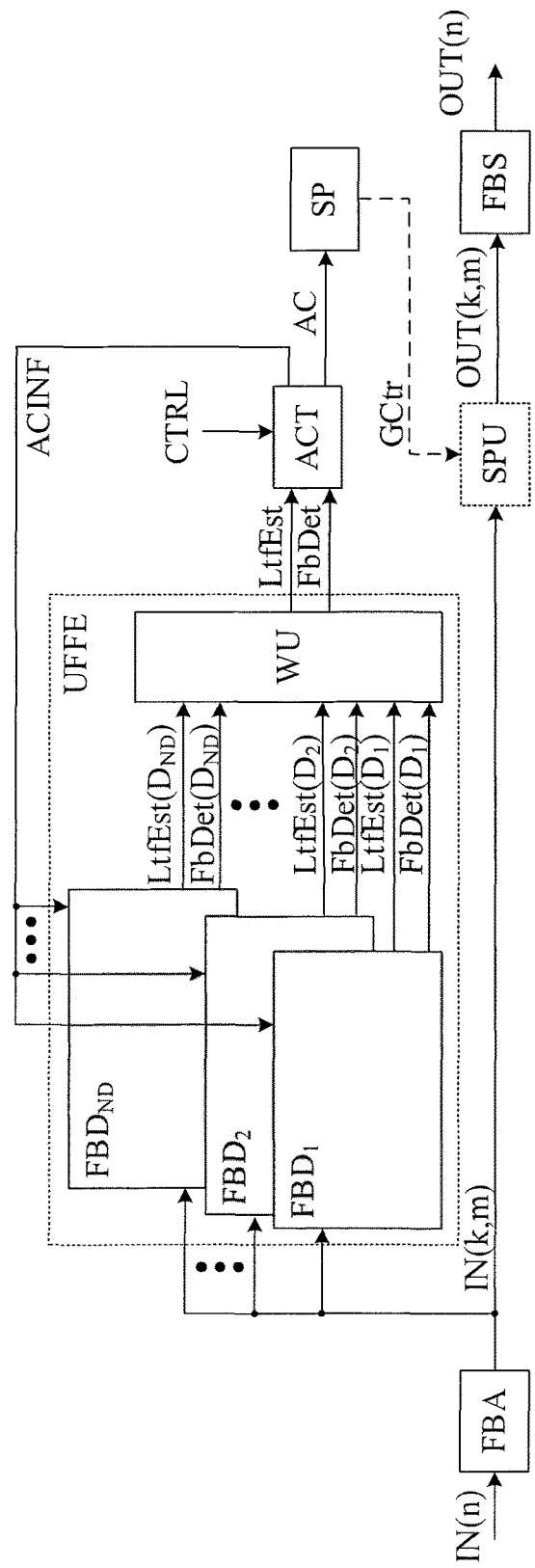
FIG. 7 shows a block diagram of a s embodiment of a feedback detector according to the present disclosure in a sound processing environment.

FIG. 7 shows a block diagram of a second embodiment of a feedback detector according to the present disclosure in a sound processing environment. The embodiment of FIG. 7 comprises the same elements as the embodiment of FIG. 2. In the embodiment of FIG. 7, the feedback detection unit comprises different parallel processing units (cf. light gray shaded, overlapping units $FBD_j$, j=1, 2, . . . , $N_D$) for providing a feedback detection signal $FbDet(D_j)$, and optionally a signal ($LtfEst(D_j)$, j=1, 2, $N_D$ representing an estimate of the complex loop transfer function. Each parallel processing unit is configured to use a different loop delay $D_j$, j=1, 2, ..., $N_D$, where $N_D$ is the number of different parallel processing units. This embodiment may be of special value in situations, where the delay (d') of the acoustic feedback path is significant compared to the delay (d) of the electric forward path of the hearing device, so that the assumption that d'<<d (cf. FIG. 3) is no longer valid or valid to a smaller degree. Such situation may e.g. occur when a (acoustically) reflecting surface is (brought) in the vicinity of the user, e.g. less than 1 m from an ear of the user. In such case, a parallel estimate of the feedback situation for different assumed values of loop delay $D_j$, is of value. In an embodiment, the feedback detection unit (UFFE) is configured to assign values of loop delay from a minimum value ($D_1$) to a maximum value ($D_{ND}$) according to a predefined or adaptive scheme, where $D_1 < D_2 \ldots < D_{ND}$. The embodiment of a feedback detection unit shown in FIG. 7 further comprises a weighting unit (WU) configured to provide output feedback detection signals (FbDet and LtfEst) based on input signals from the parallel processing units $FBD_j$, j=1, ..., $N_D$, e.g. according to a predefined or adaptively determined criterion (e.g. a logic, e.g. Boolean, criterion). In an embodiment, the weighting unit (WU) is configured to select one of the feedback detection signals (FbDet($D_j$), and LtfEst($D_j$)) as the output feedback detection signals (FbDet and LtfEst). In an embodiment, the weighting unit (WU) is configured to provide a weighted combination of the feedback detection signals (FbDet($D_j$) and LtfEst($D_j$)) from the individual processing units $FBD_j$, j=1, 2, ..., $N_D$. In an embodiment, the feedback detection unit is configured to apply a (e.g. logic) criterion to the feedback detection signals FbDet($D_j$), LtfEst ($D_j$), j=1, 2, ..., $N_D$, to provide resulting feedback detection signal FbDet, LtfEst. In an embodiment, the resulting FbDet=AND(FbDet($D_j$)), j=1, 2, $N_D$, i.e. equal to '1' (corresponding to feedback detection) if any (i.e. one or more) of the different feedback detection signals FbDet($D_j$) detects feedback. In an embodiment, the criterion is that resulting feedback detection signal FbDet is equal to '1', if more than one of the different feedback detection signals FbDet($D_j$) detect feedback. In an embodiment, the feedback detector (UFFE) has access to a measured or estimated (current) value of loop delay and is configured to give particular weight to (e.g. to select) the value(s) of the feedback detection signal (and possibly the estimate of the complex loop transfer function) provided by the processing part $FBD_j$ for which $D_j$ comes closest to the measured or estimated value $D_{est}$ of loop delay.

Figure 8:
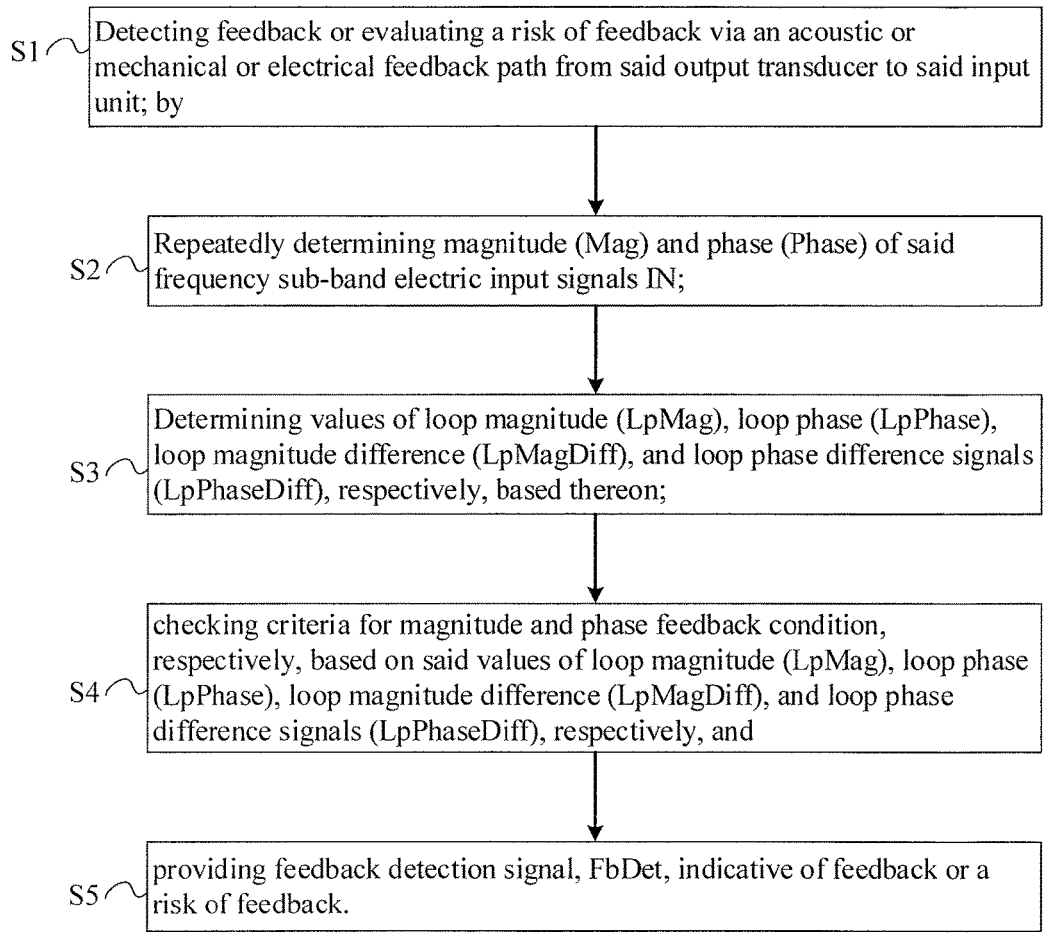
FIG. 8 shows a flow diagram for an embodiment of a method of detecting feedback in a hearing device according to the present disclosure.

FIG. 8 shows a flow diagram for an embodiment of a method of detecting feedback in a hearing device according to the present disclosure.

In the method of detecting feedback in a hearing device, the hearing device comprises a forward path for processing an electric signal representing sound. The forward path comprises an input unit for receiving or providing an electric input signal IN representing sound, a signal processing unit for applying a frequency- and/or level-dependent gain to an input signal of the forward path and providing a processed output signal, and an output transducer for generating stimuli perceivable as sound to a user.

The method comprises detecting feedback or evaluating a risk of feedback via an acoustic or mechanical or electrical feedback path from said output transducer to said input unit; by repeatedly determining magnitude (Mag) and phase (Phase) of said frequency sub-band electric input signals IN; and determining values of loop magnitude (LpMag), loop phase (LpPhase), loop magnitude difference (LpMagDiff), and loop phase difference signals (LpPhaseDiff), respectively, based thereon;

checking criteria for magnitude and phase feedback condition, respectively, based on said values of loop magnitude (LpMag), loop phase (LpPhase), loop magnitude difference (LpMagDiff), and loop phase difference signals (LpPhaseDiff), respectively, and providing feedback detection signal, FbDet, indicative of feedback or a risk of feedback.

It is intended that the structural features of the devices described above, either in the detailed description and/or in the claims, may be combined with steps of the method, when appropriately substituted by a corresponding process.

As used, the singular forms "a," "an," and "the" are intended to include the plural forms as well (i.e. to have the meaning "at least one"), unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will also be understood that when an element is referred to as being "connected" or "coupled" to another element, it can be directly connected or coupled to the other element but an intervening elements may also be present, unless expressly stated otherwise. Furthermore, "connected" or "coupled" as used herein may include wirelessly connected or coupled. As used herein, the term "and/or" includes any and all combinations of one or more of the associated listed items. The steps of any disclosed method is not limited to the exact order stated herein, unless expressly stated otherwise.

It should be appreciated that reference throughout this specification to "one embodiment" or "an embodiment" or "an aspect" or features included as "may" means that a particular feature, structure or characteristic described in connection with the embodiment is included in at least one embodiment of the disclosure. Furthermore, the particular features, structures or characteristics may be combined as suitable in one or more embodiments of the disclosure. The previous description is provided to enable any person skilled in the art to practice the various aspects described herein. Various modifications to these aspects will be readily apparent to those skilled in the art, and the generic principles defined herein may be applied to other aspects.

The claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more.

Accordingly, the scope should be judged in terms of the claims that follow.

REFERENCES

[Schaub; 2008] Arthur Schaub, Digital hearing Aids, Thieme Medical. Pub., 2008.

The invention claimed is:

1. A hearing device comprising a forward path for processing an electric signal representing sound, the forward path comprising an input unit for receiving or providing an electric input signal representing sound, a signal processing unit for applying a frequency- and/or level-dependent gain to an input signal of the forward path and providing a processed output signal, and an output transducer for generating stimuli perceivable as sound to a user;

the hearing device further comprising a feedback detection unit configured to detect feedback or evaluate a risk of feedback via an acoustic or mechanical or electrical feedback path from said output transducer to said input unit, a loop consisting of said forward path and said feedback path being defined, the loop exhibiting a loop delay D, wherein said feedback detection unit comprises a magnitude and phase analysis unit for repeatedly determining magnitude and phase of said electric input signal or a processed version thereof, and further configured to determine values of loop magnitude, loop phase, loop magnitude difference, and loop phase difference signals, respectively, based thereon and on said loop delay D, where said loop magnitude difference and said loop phase difference are the differences between values of the parameters, loop magnitude and loop phase, respectively, at a given time instant, m, and a time instant, mD, one feedback loop delay D earlier;

a feedback conditions and detection unit configured to check criteria for magnitude and phase feedback condition, respectively, based on said values of loop magnitude, loop phase, loop magnitude difference, and loop phase difference signals, respectively, and to provide feedback detection signal indicative of feedback or a risk of feedback.

2. A hearing device according to claim 1 comprising an analysis filter bank for converting said electric input signal to a number of frequency sub-band electric input signals IN(k,m), where k and m are frequency sub-band and time indices, respectively.

3. A hearing device according to claim 2 wherein the magnitude and phase analysis unit is configured to determine the loop magnitude at time instant m as $LpMag(k,m)=Mag(k,m)-Mag(k,m_D)$, where Mag(k,m) is the magnitude value of the electric input signal IN(k,m) at time m, whereas Mag(k,$m_D$) denotes the magnitude of the electric input signal IN(k,$m_D$) one feedback loop delay D earlier, and to determine the loop phase LpPhase (in radian) at time instant m as $LpPhase(k,m)=wrap(Phase(k,m)-Phase(k,m_D))$, where wrap(·) denotes the phase wrapping operator, the loop phase thus having a possible value range of [−π, π], and where Phase(k,m) and Phase (k,$m_D$) are the phase value of the electric input signal, at time instant m and at one feedback loop delay D earlier, respectively.

4. A hearing device according to claim 3 wherein the magnitude and phase analysis unit is configured to determine the loop magnitude difference LpMagDiff(k,m) at time instant m as $LpMagDiff(k,m)=LpMag(k,m)-LpMag(k,m_D)$, where LpMag(k,m) and LpMag(k,$m_D$) are the values of the loop magnitude LpMag at time instant in and at a time instant $m_u$, one feedback loop delay D earlier, respectively, and to determine the loop phase difference LpPhaseDiff(k,m) at time instant m as $LpPhaseDiff(k,m)=wrap(LpPhase(k,m)-LpPhase(k,m_D))$, where LpPhase(k,m) and LpPhase(k,m−D) are the values of the loop phase LpPhase at time instant m and at a time instant $m_D$, one feedback loop delay D earlier, respectively.

5. A hearing device according to claim 1 wherein the loop delay D is adaptively estimated during use of the hearing device.

6. A hearing device according to claim 1 wherein the loop delay D for calculating loop magnitude, loop phase, loop magnitude difference and loop phase difference is a frequency dependent value of loop delay D(k), where k is a frequency sub-band index.

7. A hearing device according to claim 3 wherein the criterion for the loop magnitude feedback condition is defined as:

$LpMagDet(k,m)=\min(LpMag(k,m),\ldots,LpMag(k,m_{N \cdot D}))>MagThresh$, where N is a number of loop delays, $m_{N \cdot D}$ is the time instant N feedback loop delay D earlier, and MagThresh is a loop magnitude threshold value.

8. A hearing device according to claim 3 wherein the criterion for the loop phase feedback condition is defined as:

$LpPhaseDet(k,m)=abs(LpPhase(k,m))<PhaseThresh$, where PhaseThresh is a threshold value.

9. A hearing device according to claim 8 wherein a criterion for feedback detection is determined based on a combination of the criteria for loop magnitude and loop phase feedback conditions as $FbDet(k,m)=and(LpMagDet(k,m), LpPhaseDet(k,m))$.

10. A hearing device according to claim 7 wherein a criterion for feedback detection is determined based on a combination of criteria for loop magnitude (LpMag) and loop phase difference (LpPhaseDiff) feedback conditions, $FbDet(k,m)=and(LpMagDet(k,m), LpPhaseDiffDet(k,m))$ where a criterion for the loop phase difference feedback condition is defined as $LpPhaseDiffDet(k,m)=abs(LpPhaseDiff(k,m))<PhaseDiffThresh$.

11. A hearing device according to claim 1 wherein the feedback detection unit further comprises a loop transfer function estimation and correction unit receiving as inputs the signals loop magnitude and loop phase, and provides as an output a complex signal representing an estimate of the complex loop transfer function.

12. A hearing device according to claim 3 wherein the loop magnitude estimate LpMagEst(k,m) is computed as the linear combination of a number P of latest values of loop magnitude LpMag(k,m), $$LpMagEst(k,m) = \sum_{p=0}^{P-1} \alpha_p \cdot LpMag(k, m-p),$$

where $\alpha_p$ are non-negative scaling factors, and $\Sigma \alpha_p = 1$.

13. A hearing device according to claim 11 further comprising an action information unit configured to take as inputs the feedback detection signal and the complex loop transfer function estimate from the feedback detection unit and to provide as an output an action information signal.

14. A hearing device according to claim 13 wherein the action information unit comprises an input control signal configured to activate actions that may influence the feedback detection.

15. A hearing device according to claim 14 wherein the action information unit is configured to test actions activated via the control signal of the action information unit.

16. A hearing device according to claim 1 wherein the feedback detection unit comprises different parallel processing units for providing a feedback detection signal FbDet ($D_j$), each being configured to use a different loop delay $D_j$, $j=1, 2, \ldots, N_D$, where $N_D$ is the number of different parallel processing units.

17. A hearing device according to claim 1 wherein the hearing device is or comprises a hearing aid.

18. A hearing device according to claim 1 wherein the hearing device is or comprises a headset.

19. A method of detecting feedback in a hearing device, the hearing device comprising a forward path for processing an electric signal representing sound, the forward path comprising
   an input unit for receiving or providing an electric input signal representing sound,
   a signal processing unit for applying a frequency- and/or level-dependent gain to an input signal of the forward path and providing a processed output signal, and
   an output transducer for generating stimuli perceivable as sound to a user, the method comprising
      detecting feedback or evaluating a risk of feedback via an acoustic or mechanical or electrical feedback path from said output transducer to said input unit, a loop consisting of said forward path and said acoustic or mechanical or electrical feedback path being defined, the loop exhibiting a loop delay D; by
      repeatedly determining magnitude and phase of said electric input signal or a processed version thereof; and
      determining values of loop magnitude, loop phase, loop magnitude difference, and loop phase difference signals, respectively, based thereon and on said loop delay D, wherein said loop magnitude difference and said loop phase difference are the differences between values of the parameters, loop magnitude and loop phase, respectively, at a given time instant, m, and a time instant, mD, one feedback loop delay D earlier;
      checking criteria for magnitude and phase feedback condition, respectively, based on said values of loop magnitude, loop phase, loop magnitude difference, and loop phase difference signals, respectively, and
      providing a feedback detection signal indicative of feedback or a risk of feedback.

20. A data processing system comprising a processor and program code means for causing the processor to perform the steps of the method of claim 19.

* * * * *